BEST AVAILABLE COPY

June 27, 1972 A. L. EHE ET AL Re. 27,405

CANDY PACKAGING MACHINE

Original Filed Sept. 2, 1965 8 Sheets-Sheet 1

INVENTORS
ALBERT L. EHE &
CHARLES T. MILLIGAN
BY Polachek & Saulsbury
ATTORNEYS

CANDY PACKAGING MACHINE

Original Filed Sept. 2, 1965 8 Sheets-Sheet 2

INVENTORS
ALBERT L. EHE &
CHARLES T. MILLIGAN
BY Polachek & Saulsbury
ATTORNEYS

CANDY PACKAGING MACHINE

Original Filed Sept. 2, 1965 8 Sheets-Sheet 3

INVENTORS
ALBERT L. EHE &
CHARLES T. MILLIGAN

BY Polachek & Saulsbury
ATTORNEYS

CANDY PACKAGING MACHINE
Original Filed Sept. 2, 1965 8 Sheets-Sheet 4
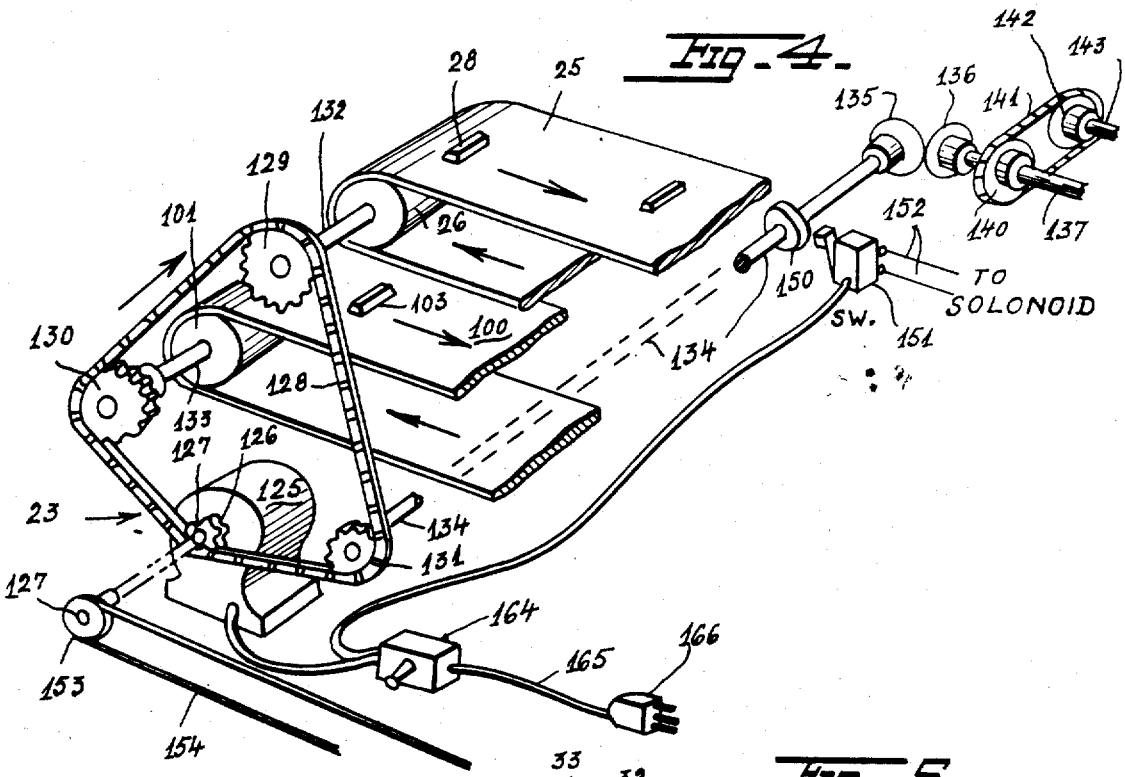
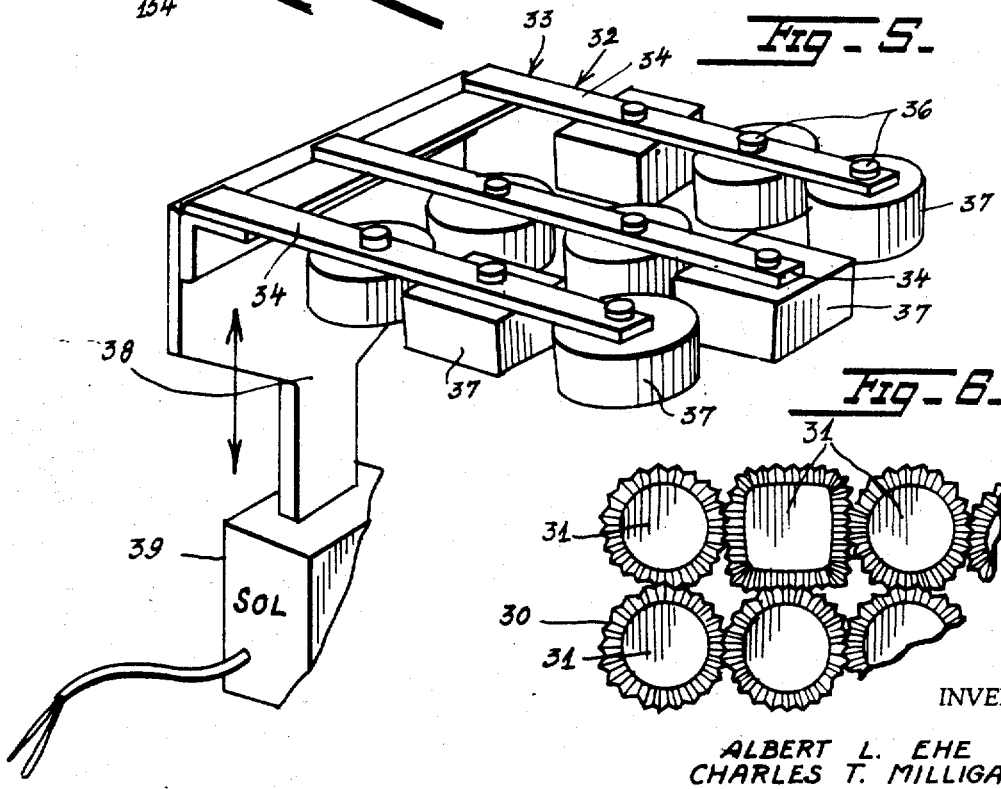
INVENTORS
ALBERT L. EHE &
CHARLES T. MILLIGAN
BY Polachek & Saulsbury
ATTORNEYS

CANDY PACKAGING MACHINE

Original Filed Sept. 2, 1965 8 Sheets-Sheet 5

INVENTORS
ALBERT L. EHE &
CHARLES T. MILLIGAN

BY Polachek & Saulsbury
ATTORNEYS

CANDY PACKAGING MACHINE
Original Filed Sept. 2, 1965 8 Sheets-Sheet 6
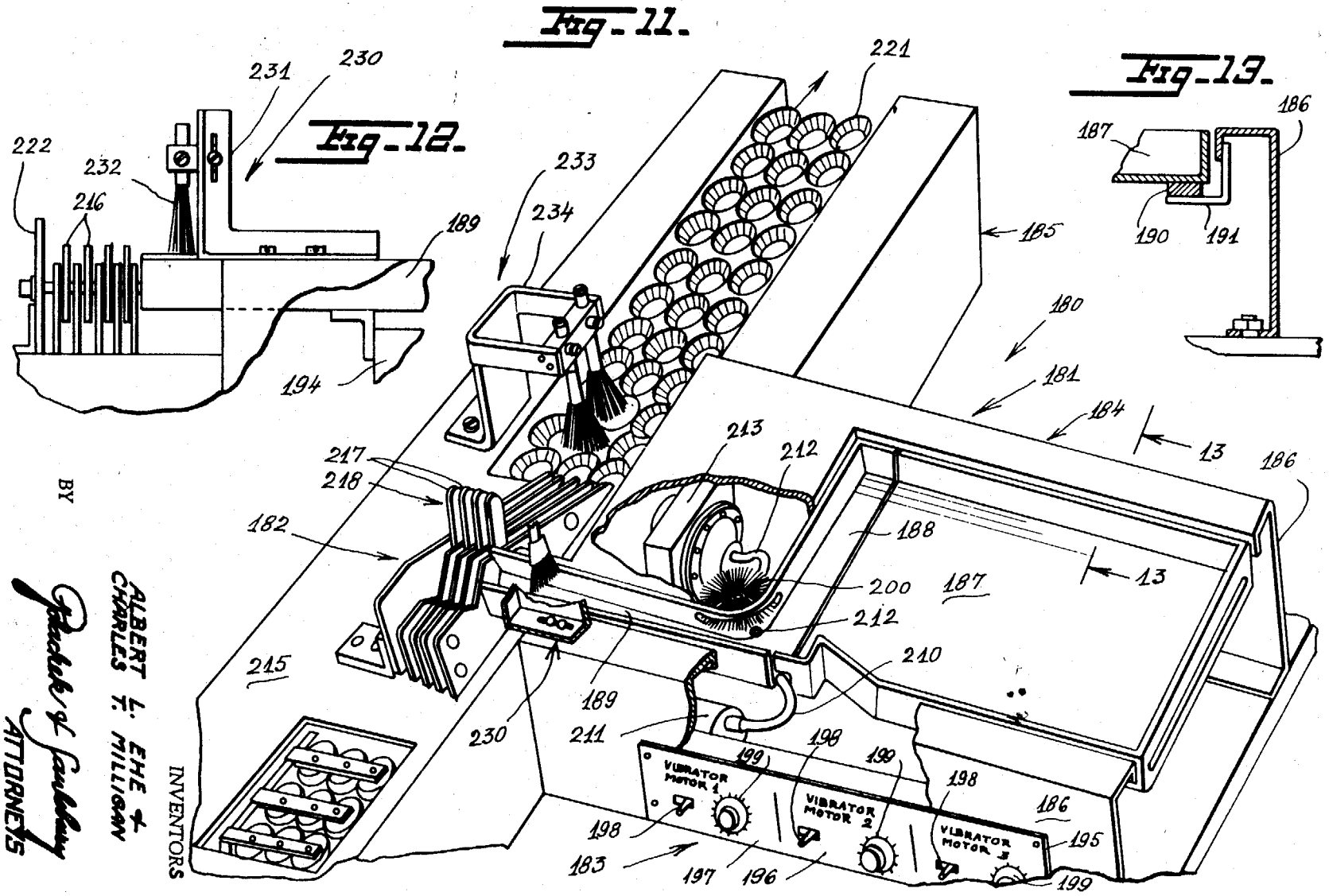
INVENTORS
ALBERT L. EHE &
CHARLES T. MILLIGAN
BY Pollock & Sanderson
ATTORNEYS

CANDY PACKAGING MACHINE

Original Filed Sept. 2, 1965 8 Sheets-Sheet 7

INVENTORS
ALBERT L. EHE &
CHARLES T. MILLIGAN

BY Potschek & Saulsbury
ATTORNEYS

CANDY PACKAGING MACHINE

Original Filed Sept. 2, 1965 8 Sheets-Sheet 8

INVENTORS
ALBERT L. EHE &
CHARLES T. MILLIGAN

BY Polachek & Saulsbury
ATTORNEYS

United States Patent Office

Re. 27,405
Reissued June 27, 1972

27,405

CANDY PACKAGING MACHINE

Albert L. Ehe and Charles T. Milligan, Queens County, N.Y., assignors to Multicup Automation Company, Inc., Woodside, N.Y.

Original No. 3,389,531, dated June 25, 1968, Ser. No. 484,596, Sept. 2, 1965. Application for reissue June 10, 1970, Ser. No. 45,273
Int. Cl. B65b *35/14, 35/54, 1/02*
U.S. Cl. 53—126 14 Claims

Matter enclosed in heavy brackets [ ] appears in the original patent but forms no part of this reissue specification; matter printed in italics indicates the additions made by reissue.

ABSTRACT OF THE DISCLOSURE

*Two conveyor systems are arranged side by side. A compartmented tray is positioned at predetermined positions on one conveyor. The compartments may be shaped to accommodate candy pieces. Individual pieces of candy are deposited into individual compartments. After the trays have been filled with candy pieces, they are moved into individual boxes which are located on a conveyor.*

Figure 1:
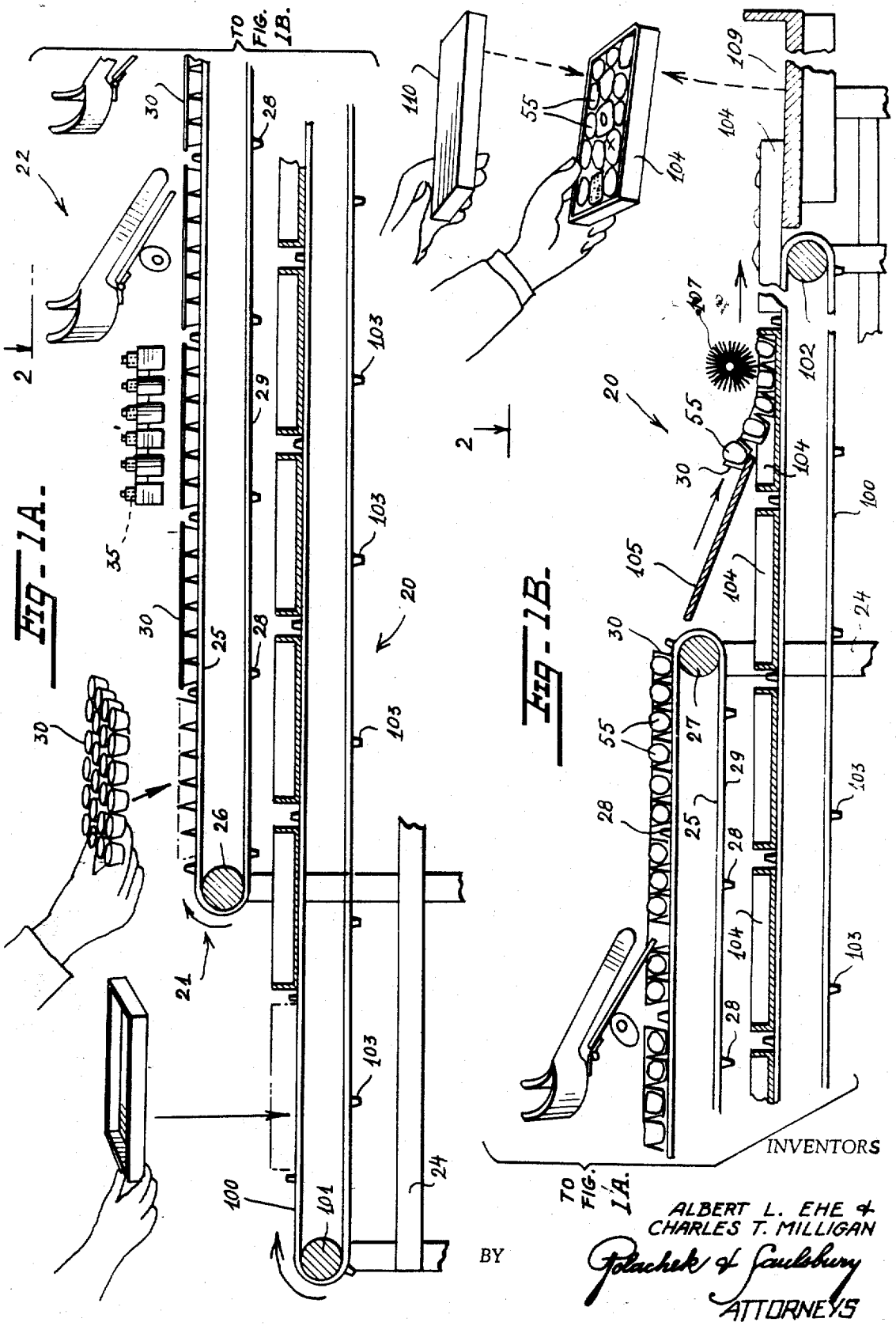

This invention relates generally to candy packaging machinery. More specifically it relates to candy box filling machinery.

It is well known to those skilled in the art that candy boxes containing an assortment of chocolate covered candies are generally filled by hand without the aid of automatic machinery. The reason for this is that heretofore machinery had not been developed that could handle the chocolate pieces without bruising the chocolate surfaces. Various attempts have been made unsuccessfully in the past in designing automatic machinery for replacing the manual laborers in this task. An electronic machine designed for this purpose has been estimated to be of prohibitive cost and accordingly not practical for the general candy industry. Meantime the present hand labor adds to the retail costs and is in want of improvement. Accordingly the above situation is not desirable in an industry where other operations are modernized by mechanization.

Accordingly it is a principal object of the present invention to provide a candy box filling machine which will eliminate the need of costly manual labor to accomplish the same.

It is another object of the present invention to provide a candy box filling machine that has self-contained means to load a candy box with an assortment of chocolate pieces.

Another object is to provide a candy box filling machine that has self-contained means to load each particular kind of chocolate piece in a particular station or within a particularly assigned cup for that chocolate piece in all of the candy boxes.

Another object is to provide a candy box filling machine that can be reset for placing a particular candy piece in a differently assigned cup and handle various other kinds of candy pieces thereby providing flexibility in change over from one assortment of candies to another.

Another object is to provide a candy box filling machine employing a plurality of candy chutes and platform, each of which is individually vibrated to move the candy pieces into a specific direction toward the loading unit.

Another object is to provide a candy box filling machine having pneumatic means for automatically starting the vibration of candy supply platforms when the chutes become empty of candy pieces, thereby maintaining the machine in continuous unattended operation.

Another object is to provide a candy box filling machine wherein lateral brushes are employed to urge the candy pieces forwardly toward the loading unit.

Another object is to provide a candy box filling machine wherein the candy pieces are at one position on a vibrating member while being brushed by a brush supported on a stationary member whereby the vibration motion is utilized for accomplishing fine brushing action.

Another object is to provide a candy box filling machine that has self-contained means to reshape selected fluted cups in the paper or plastic tray so as to accommodate various odd shaped candy pieces which have a base periphery other than round.

It is still another object of the invention to provide a candy box filling machine having means to automatically place the fluted cup tray into the candy box after the tray has been filled with candy pieces.

It is a further object of the invention to provide a candy box filling machine that is adaptable for selectively filling candy boxes of various shapes and sizes and wherein a different number of candy pieces can be used.

It is a still further object of the invention to provide a candy box filling machine wherein the chocolate pieces are "bottom handled" only to insure that the candy appearance is not marred.

It is a still further object of the invention to provide a candy box filling machine wherein various different numbers of same candies may be loaded into the tray in succession or spaced apart at intervals as desired.

Other objects are to provide a candy box filling machine that is relatively simple in design, rugged in construction, fully adjustable, easy to operate and efficient in operation.

Figure 2:
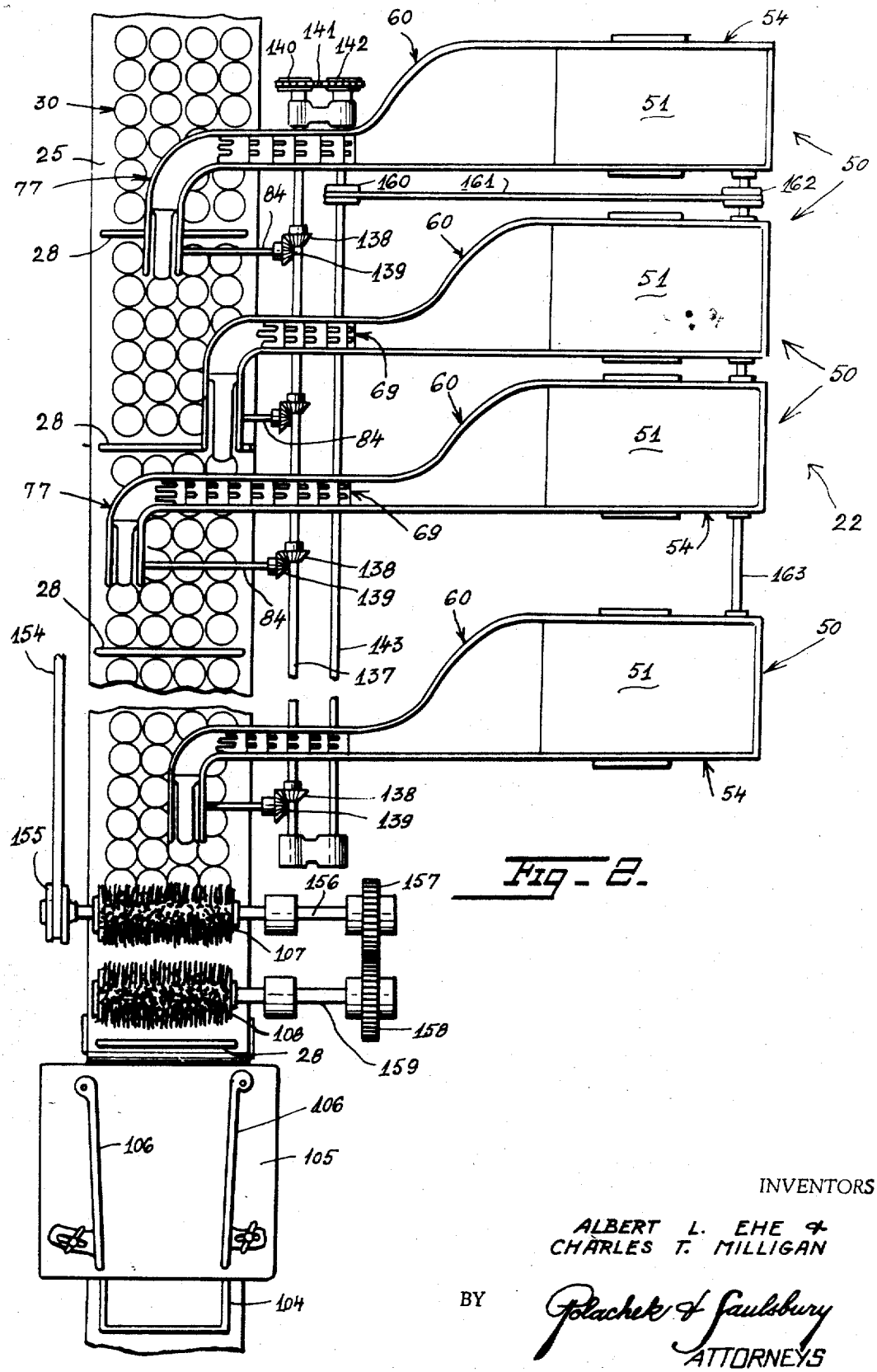
Figure 3:
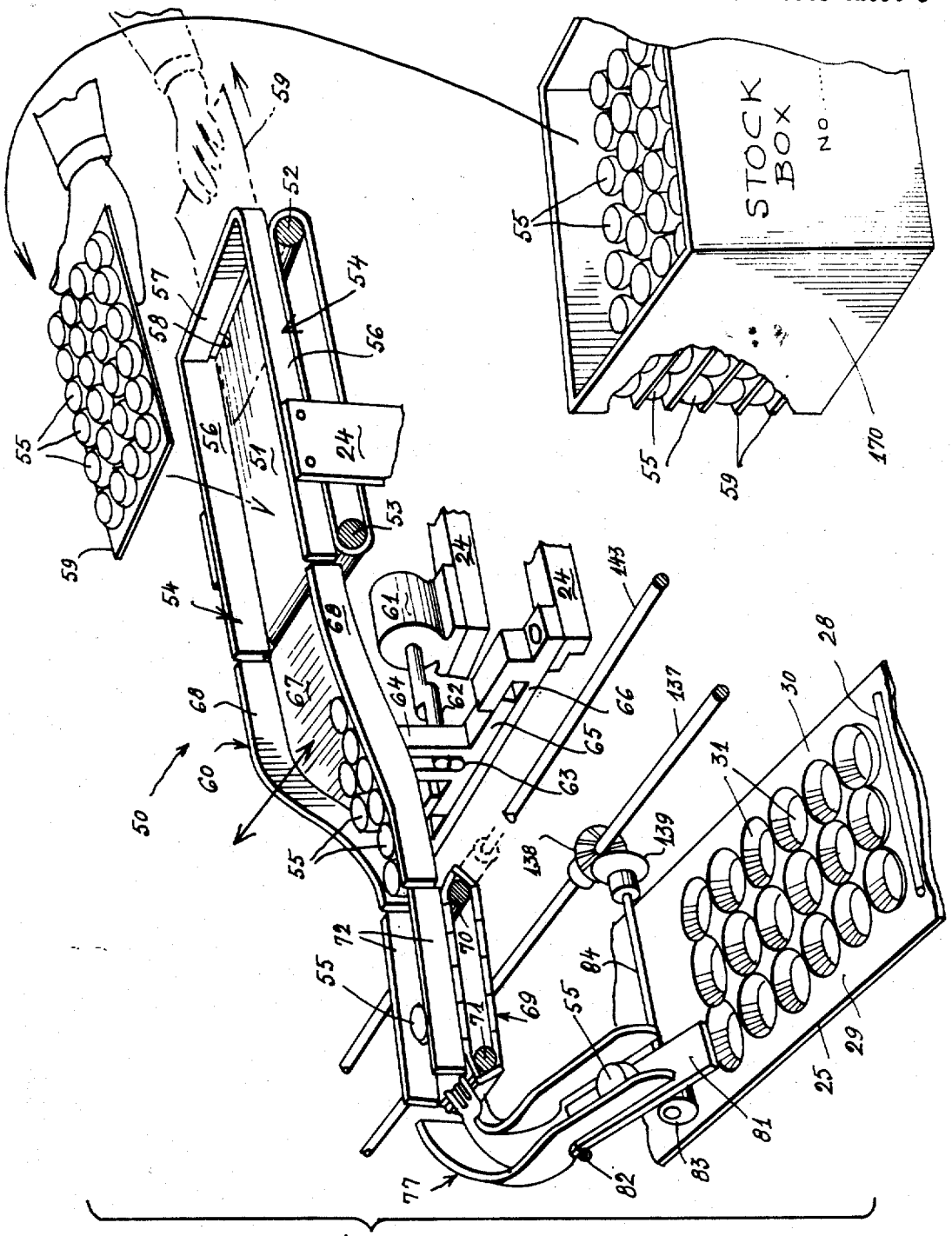
Figure 7:
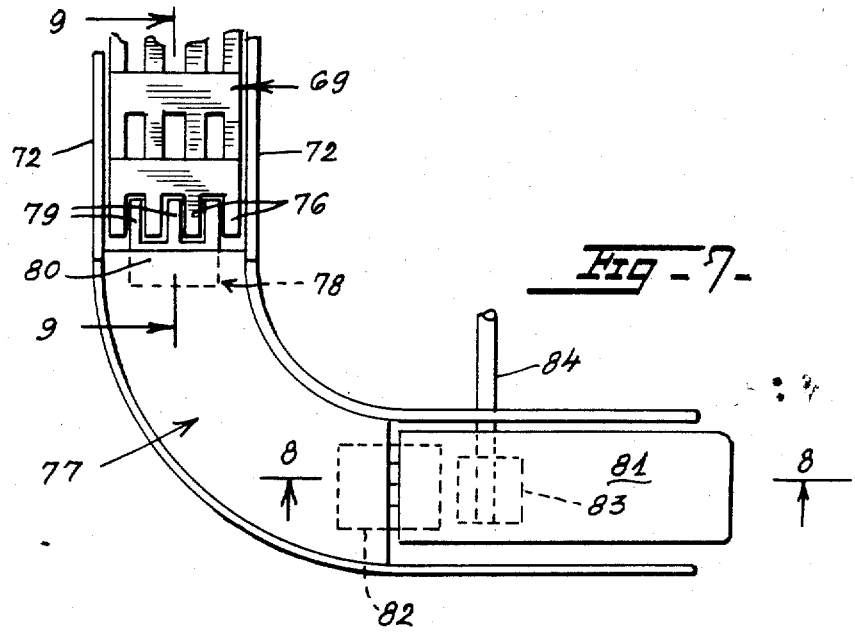
Figure 8:
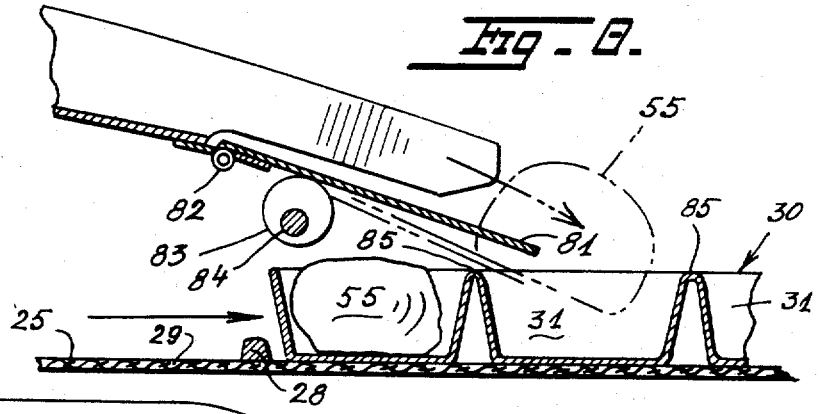
Figure 9:
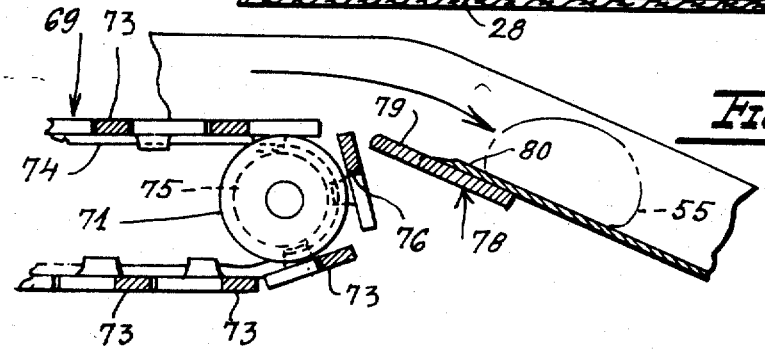
Figure 10:
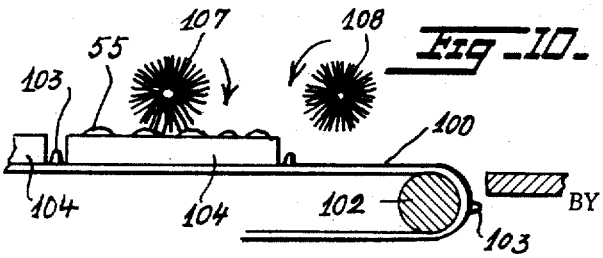
Figure 14:
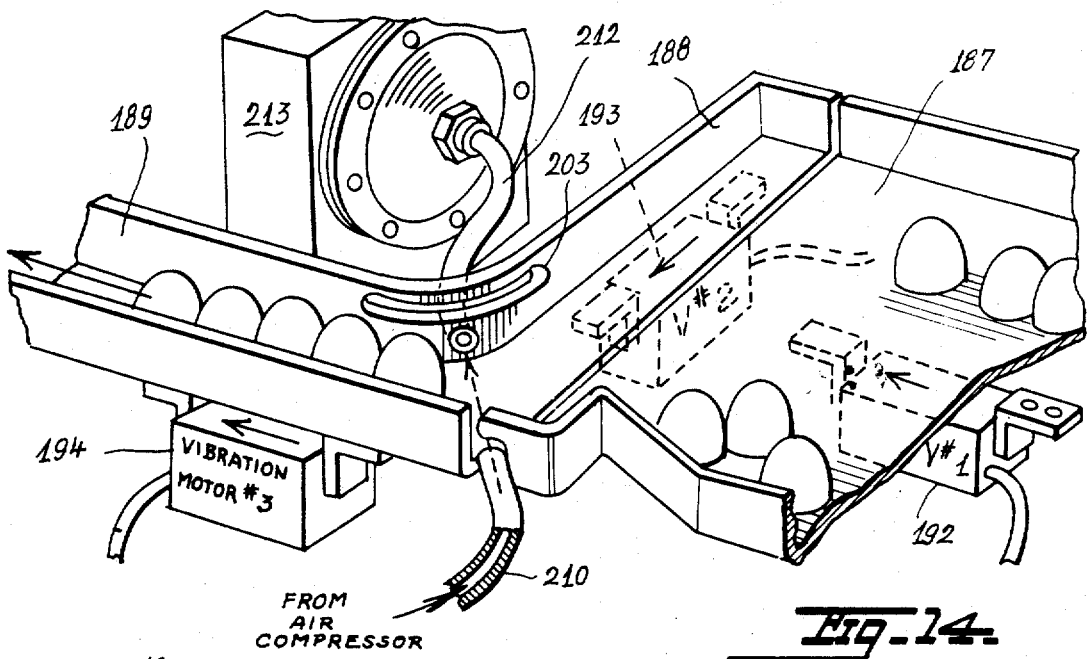
Figure 15:
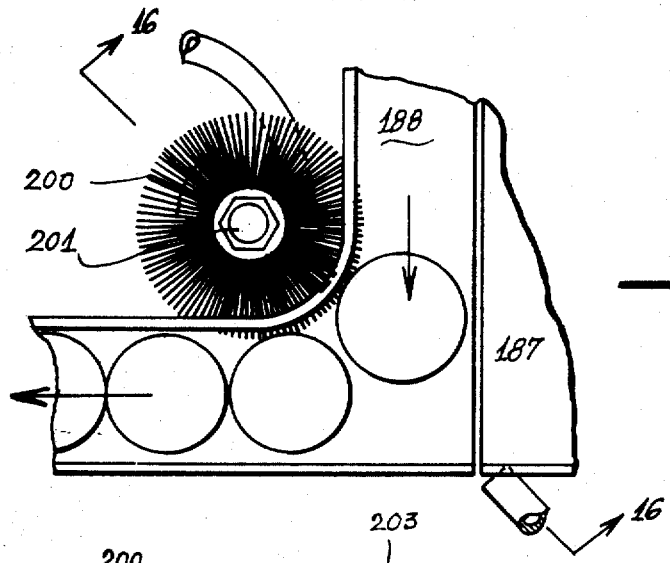
Figure 16:
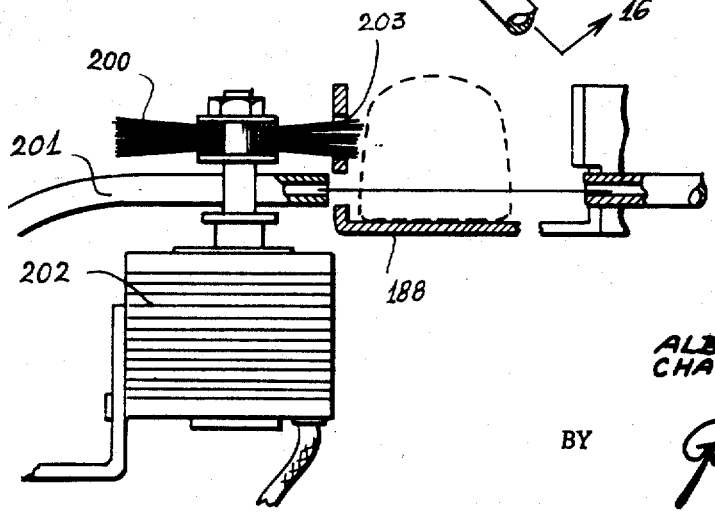
Figure 17:
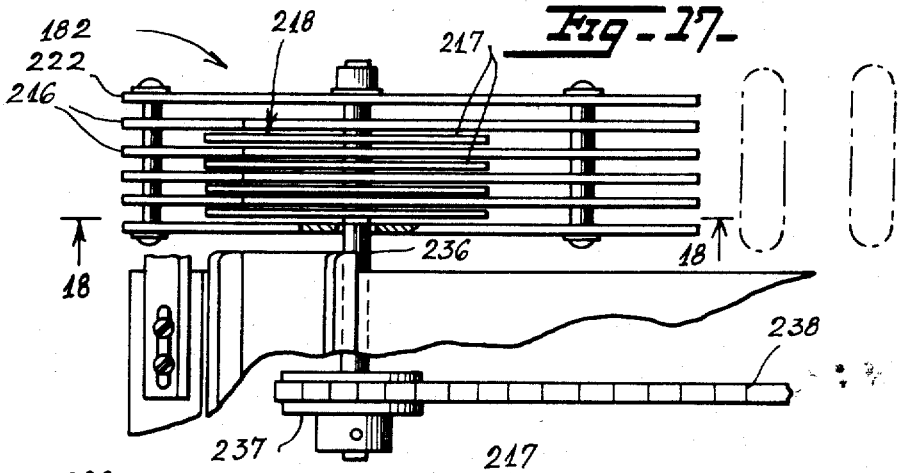
Figure 18:
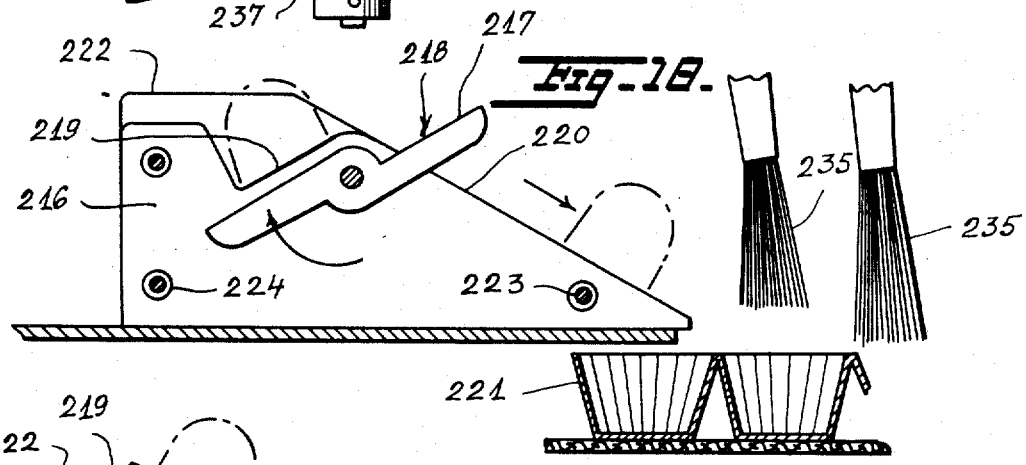
Figure 19:
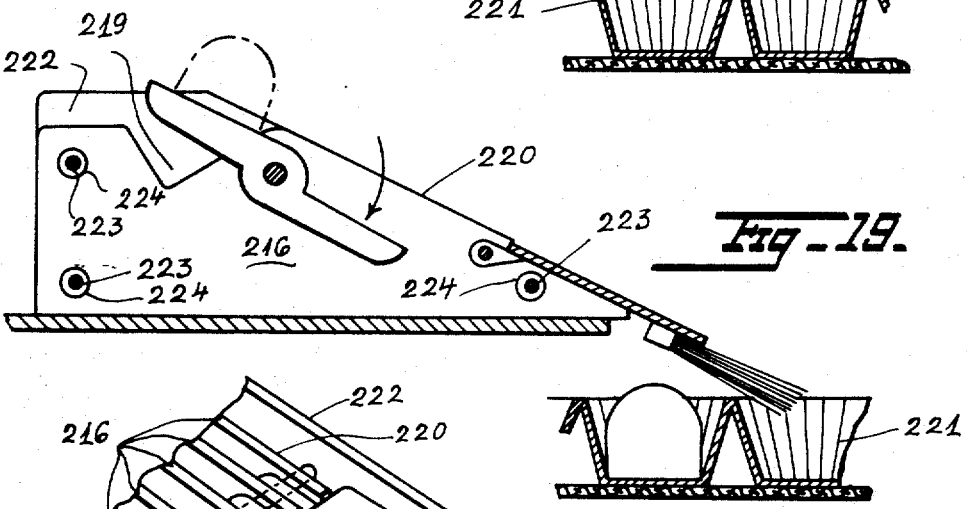
Figure 20:
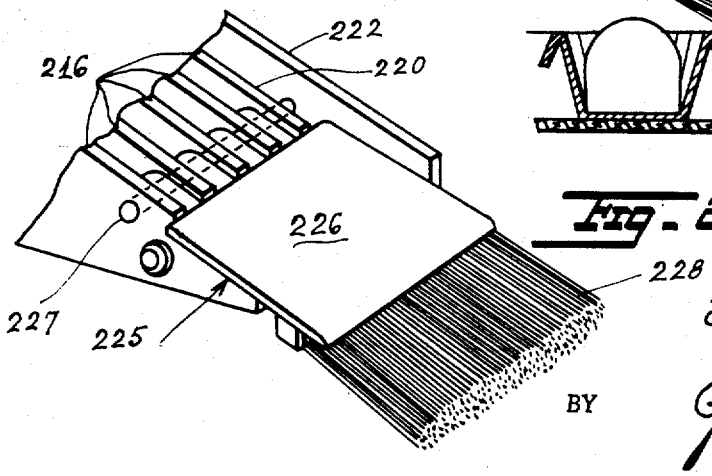

These and other objects will be readily evident upon a study of the following specification and the accompanying drawings wherein:

FIG. 1A and FIG. 1B in combination are a cross-sectional side view of the present invention, FIG. 2 is a fragmentary plan view taken on line 2—2 of FIGS. 1A and 1B, FIG. 3 is a fragmentary perspective view of the candy loading mechanism of the machine, FIG. 4 is a fragmentary perspective view of the drive mechanism of the machine, FIG. 5 is a perspective view of the fluted paper cup reshaping die mechanism, FIG. 6 is a fragmentary plan view of a fluted cup tray after being reshaped by dies, FIG. 7 is a fragmentary plan view of the candy discharge chute, FIG. 8 is a cross-sectional view taken on line 8—8 of FIG. 7, FIG. 9 is a cross-sectional view taken on line 9—9 of FIG. 7, FIG. 10 is a cross-sectional side view showing the candy top brushing mechanism, FIG. 11 is a top perspective view of a modified construction of the present candy box filling machine, FIG. 12 is a side elevational view of structure shown fragmentarily in FIG. 11, FIG. 13 is a fragmentary cross-sectional view taken on line 13—13 of FIG. 11, FIG. 14 is an enlarged perspective view of a portion of the structure shown in FIG. 11, FIG. 15 is a fragmentary top plan view thereof, FIG. 16 is a cross-sectional view taken on line 16—16 of FIG. 15, FIG. 17 is a top plan view of the loading unit used in the machine shown in FIG. 11, FIG. 18 is a cross-sectional view taken on line 18—18 of FIG. 17, FIG. 19 is a view similar to FIG. 18 showing the mechanism in a subsequent position and also showing a modified construction, and FIG. 20 is a fragmentary perspective view thereof.

Referring now to the drawings in detail, the numeral 20 represents a candy box filling machine according to the present invention wherein there is a fluted cup tray loading mechanism 21 and a candy loading mechanism 22, both the mechanisms being driven by a drive mechanism 23 shown in FIG. 4.

The mechanisms are mounted upon a frame 24 shown fragmentarily in FIGS. 1A and 1B and wherein the mechanisms are at convenient elevations for being tended and serviced during candy box filling operations.

The tray filling mechanism includes an endless belt 25 movable across rollers 26 and 27. The belt has a plurality of equally spaced apart cleats 28 on the outer side 29, which serve to identify the position therebetween where a tray 30 is manually placed as shown in FIG. 1A, so that it arrives at properly timed moments at stations where subsequent operations are performed therewith at timed intervals..

A first operation involving the tray comprises a die stamping operation wherein the normally circular cup 31 is reshaped to accommodate a candy piece having a rectangular, triangular or other peripheral shaped base. A die assembly 32 is positioned directly over the belt (see FIGS. 1A, 5 and 6). The die assembly comprises a horizontal frame 33 having a plurality of arms 34 each of which has openings 35 therein for receiving bolts 36 to each of which an individual die 37 is secured. The frame 33 is mounted on a vertical support 38 the lower end of which is vertically slidable within a solenoid 39 thus causing the dies to descend into the cups 31 momentarily as the tray 30 passes therebelow.

At intermediate points between the die assembly and the roller 27 various candies are deposited into the tray cups, this operation being described in detail herebelow in the structural description of the candy loading mechamism 22.

The candy loading mechanism 22 comprises a plurality of loading assemblies 50 one of which is illustrated in FIG. 3, and a plurality of which are illustrated in FIG. 2.

Each loading mechanisms includes an endless belt 51 mounted to travel over rollers 52 and 53. Preferably the belts 51 are positioned to travel in a transverse direction on the machine in contrast to the travel of belt 52 in a longitudinal direction on the machine. The reason for this is so that the loading assemblies 50 may be spaced apart around the machine for conveniently being serviced during operation, instead of all originating from the same area at one longitudinal end of the machine. A U-shaped frame 54 mounted on machine frame 24 is located over belt 51 and serves as a guide to keep candies 55 from falling off the belt. The frame 54 includes a pair of side walls 56 and a connecting wall 57 the lower edge 58 of which is spaced from the top of belt 51 so to permit withdrawal therebetween of flat tray 59 during candy loading operation of belt 51.

Adjacent the belt 51 there is a vibrating platform 60 which is vibrated by a motor 61 having an eccentric shaft 62 that rides in a slot 63 of a post 64 mounted on the underside of platform 60. The post has a base 65 that is horizontally slidable in a bracket 66 mounted securely on machine frame 24. The platform has a bottom wall 67 that is horizontal at the end adjacent belt 51 and is increasingly inclined toward its opposite end to cause candies to be vibrated toward one side. Side walls 68 on the vibrator converge toward the said opposite end to cause the candies to be discharged therefrom in a single line as shown in FIG. 3. Adjacent this discharge or outlet end of the vibrating platform there is an endless belt 69 mounted over rollers 70 and 71. Side walls 72 fixed to machine frame 24 guide the candies during travel over the belt. As shown in FIGS. 7 and 9, the belt 69 is comprised of a plurality of panels 73 affixed to an endless belt element 74 that travels within grooves 75 on each roller 70 and 71. Each panel has a fork configurated leading edge forming fork tines 76.

Adjacent the outlet end of belt 69 a chute 77 of arcuate configuration receives the candies. A trifurcated tongue 78 having tines 79 is secured to the end 80 of the chute for purposes of transferring the candies from belt 69 to the chute. The tines 76 pass between tines 79 as the belt travels thus causing a smooth gentle transfer of the candies without tilting the same and possibly bruising the candy's upper side on the machine. The chute is downwardly inclined toward its outlet end as shown in FIG. 8. At the outlet end thereof a platform 81 is secured by a hinge 82 to the chute main body. A cam 83 therebelow, mounted on rotating shaft 84 moves the platform 81 intermittently up and down to clear the edges 85 of the fluted cups 31 of trays 30 passing therebelow on belt 25.

Below the candy loading mechanism 21 and the tray loading mechanism 22, there is an endless belt 100 that travels the full longitudinal length of the machine and moves over rollers 101 and 102 at opposite ends. Equally spaced apart cleats 103 on the belt 100 provide spaces therebetween for manually placing therein the bottom member 104 of a cardboard candy box. The candy box member 104 travels below the mechanism 22.

At the outlet end of belt 25 a downwardly inclined chute 105 receives the candy loaded trays which slide down the chute between adjustable side walls 106 and into the box members 104, passing therebelow.

Subsequently the loaded box members pass under a pair of oppositely rotating rotary brushes 107 and 108 having soft fine bristles for the purpose of brushing the tops of the candies to polish the same.

Adjacent the roller 102 there is a stationary platform 109 upon which the loaded box members 104 are pushed from the belt 100, and from which they are manually removed and covered by a box cover 110.

The drive mechanism 23 for the machine shown in FIGS. 2, 3 and 4 includes an electric main motor 125 having a sprocket 126 on its output shaft 127 that drives an endless chain 128 passing over gears 129, 130 and 131.

Gear 129 on a shaft 132 drives roller 26 in the tray loading mechanism.

Gear 130 on a shaft 133 drives roller 101 for delivering box bottoms 104 into loading station.

Gear 131 on a shaft 134 drives through bevel gears 135 and 136 a shaft 137 on which a plurality of bevel gears 138 are affixed to drive bevel gears 139 affixed on shafts 84 of each loading assembly 50. A gear 140 on shaft 139 drives an endless chain 141 passing over a gear 142 on a shaft 143, and provides power means to rotate rollers 70 of belt 69 mounted thereupon in each loading assembly 50.

A cam 150 mounted on shaft 134 actuates a microswitch 151 connected by wires 152 to the solenoid 39 for operating the same.

It is to be understood that all the above described drive elements are adjustable in speed so that the timing of the various operations of the machine are in complete harmony to work with one another.

A pulley 153 also mounted on motor output shaft 127 drives a belt 154 passed around pulley 155 mounted on a shaft 156 and thus provides power to rotate brush 107 mounted on shaft 156. A gear 157 also mounted on shaft 156 engages a gear 158 mounted on shaft 159 to rotate brush 108 also mounted on shaft 159.

A pulley 160 on shaft 137 drives an endless belt 161 around a pulley 162 on a shaft 163 upon which rollers 52 of each loading assembly are mounted, thereby providing power to belts 51.

In operative use, the main motor 125 is turned on by a switch 164 connected by wires 165 and plug 166 to a source of electrical power. The vibrating motors 61 in each loading assembly are also turned on. All the drive elements are adjusted for harmonious synchronization in timing of mechanical operations.

Workers take flat trays loaded with candies out of stock boxes 170. It is understood that each stock box has only one kind of candy therein. The flat trays 59 are placed on belt 51, the tray edge being then pushed under the edge 58 and pulled out as indicated by phantom lines in FIG. 3 thus leaving the candy alone upon the belt. Box members 104 are placed on belt 100 manually. Trays 30 are placed manually on belt 25. The candies are guided through each loading assembly 50 and discharged therefrom in a specific timed sequence special for each loading unit.

It is understood that different kinds of cany have their own loading assembly 50. Each loading assembly discharges candy to a particular cup in each tray assigned for the particular candy, as is evident in FIG. 2. Thus each loading assembly is assigned to load a particular cup. A machine for filling a candy box having, for example, 72 cups may have 72 loading assemblies.

Thus boxes of assorted chocolate candies may be efficiently and more quickly loaded by a mass production method.

In FIGS. 11 through 20, a modified construction of the machine 180 is shown to include a housing 181 which supports several novel features. The machine includes a novel candy loading unit 182 that raises a candy piece from its bottom side and moves it to a loading chute; the machine additionally incorporates a vibrating system 183 for moving candy pieces into various directions; and it includes a pneumatic system for automatically starting a part of the vibrating system so to maintain a steady movement of candy pieces through the machine thus eliminating continuous attention of the operator.

The housing 181 includes a housing element 184 at right angle to a housing element 185. The housing element 184 includes a pair of upstanding spaced apart side walls 186 which support by relatively freely movable means a platform 187 and a pair of chutes 183 and 189. As shown in FIG. 13, a rubber cushion 190 on a bracket 191 or other equivalent means may be used. The platform has a vibration motor 192 mounted on its underside, and the chutes 188 and 189 have vibration motors 193 and 194 respectively also secured to their undersides for purpose of imposing vibration thereto. As will be noted by the arrows in FIG. 14 the vibrator motors are positioned so that the candy pieces will be urged toward the directions indicated by the arrows. Control panels 195, 196 and 197 contain switches 198 and speed control dials 199 for operating the vibrating motors.

A rotary brush 200 horizontally positioned on shaft 201 of a motor 202 protrudes through side wall opening 203 of chute 183 and provides a means for urging the candy pieces to travel around the corner as shown in FIG. 15.

An air hose 210 is connected to an output end of an air compressor 211 normally in continuous operation during the machine operation. The end of the hose is secured on one side wall of the chute 188, and the end of a second hose 212 is secured to the opposite side wall in a position so that the candy pieces travel therebetween. Hose 212 at its other end is secured to a pneumatic switch unit 213 wherein an air movable diaphragm activates a micro-switch (not shown). The micro-switch is in an electric circuit with the vibrator motor 192. Thus when more candy pieces fail to pass between the hose ends, the air blast from hose 210 enters hose 211 which activates the electric circuit to the vibrator motor 192 thus causing the supply of candy pieces on the platform to move to the chutes.

The outlet end of chute 189 is tilted as shown in FIG. 11. A loading unit 182 mounted on the top panel 215 of housing element 185 is adjacent the outlet to receive the candy pieces.

Loading unit 182 is comprised of a plurality of upstanding equally spaced apart plates 216 between each of which an arm 217 of a rotating lever 218 extends. The upper edge of each plate 216 includes a depression 219 into which the candy pieces move, and a diagonally downwardly inclined edge 220 along which the candies subsequently slide toward the trays 221. An end plate 222 of taller size serves as a back stop for the candies. The plates 216 and end plate 222 are secured together by rods 223 having collars 224 thereupon between the plates.

FIGS. 19 and 20 show a modified loading unit including a hinged brush unit 225 at the lower end of edges 220. The brush unit includes a flat panel 226 hinged on pin 227 and carrying a brush 228.

A brush unit 230 is stationarily mounted on side wall 186 and includes a bracket 231 and brush 232 which brushes the vibrating candies supported on the chute 189, as the candies pass by.

Another brush unit 233 supported on housing unit 185 includes a bracket 234 supporting brushes 235 and is used instead of the brush structure shown in FIGS. 19 and 20.

The lever 218 is centrally supported on a shaft 236 extending into the housing element 185 where a sprocket 237 mounted on the shaft is engaged by a sprocket chain 238 connected to a power drive source.

In operative use the lever arms raise the candy pieces from their bottom sides and deposit them on the inclined edge 220 where the candies slide into the trays moving on an endless belt within housing 185 (not shown).

While various changes may be made in the detail construction, it is understood that such changes will be within the spirit and scope of the present invention as is defined by the appended claims.

What is claimed is:

1. In a candy box filling machine the combination of a tray loading mechanism, a candy loading mechanism and drive means for said tray loading mechanism and said candy loading mechanism, said tray loading mechanism comprising a first endless [belt] *conveyor* upon which cup trays are placed at *substantially* one end of said [machine] *first endless conveyor,* and carried thereacross beneath said candy loading mechanism, said candy loading mechanism comprising a plurality of loading assemblies, each of said loading assemblies having means for receiving a flat tray loaded with [the same kind of] candy pieces from a stock box and for discharging individually each candy piece in timed sequence into [a particular] *at least one* cup of said cup trays when said cup trays are at intermediate points between the ends of said machine, [said candy loading mechanism also comprising] means for loading candy filled cup trays into candy boxes, and a second endless [belt] *conveyor* between opposite ends of said machine, said second [belt] *conveyor* being below said first [belt] *conveyor,* said second [belt] *conveyor* receiving said candy boxes thereupon at one end of said machine and carrying said candy boxes thereacross to the opposite end of said machine, said candy boxes at an intermediate point between the opposite ends of said machine receiving therein the candy filled cup trays from said [candy loading mechanism] *first endless conveyor.*

2. In a candy box filling machine the combination as set forth in claim 1, wherein each said loading assembly comprises a candy flat tray receiving belt, a vibrator adjacent said receiving belt, a narrow belt adjacent said vibrator and a chute adjacent said narrow belt.

3. In a candy box filling machine the combination as set forth in claim 2 wherein said candy flat tray receiving belt comprises a wide endless belt passing around a pair of spaced apart rollers and a U-shaped frame over said belt providing guide means for said candy, said U-shaped frame having parallel opposite upstanding sides and an intermediate connecting side therebetween, said intermediate side having a lower edge spaced apart from the upper side of said receiving belt to permit withdrawal of said flat tray.

4. In a candy box filling machine the combination as set forth in claim 3 wherein said vibrator comprises a platform level at one end and diagonally inclined at the opposite end, said level end being adjacent said receiving belt, an upstanding side wall on opposite sides of said platform, said side walls converging toward said inclined end to allow discharge of only one said candy at a time therefrom.

5. In a candy box filling machine the combination as set forth in claim 4, wherein said narrow belt is comprised of a plurality of panels secured to an endless belt passing within grooves of a pair of spaced apart rollers and each of said panels having a leading edge having a forked configuration formed into tines.

6. In a candy box filling machine the combination as set forth in claim 5 wherein said chute has a projecting tongue secured at an end adjacent said narrow belt, said tongue being trifurcated to form tines, said tines of said fork being received between said tines of said belt when said belt travels across said rollers.

7. In a candy box filling machine the combination as set forth in claim 6, wherein said chute is downwardly inclined toward one end forming a discharge end, a hinged bottom panel at the discharge end, a cam under said hinged panel, said cam being on a shaft driven by said drive means for raising and lowering said hinged panel intermittently to clear the upper edges of said fluted cups of said tray.

8. In a candy box filling machine the combination as set forth in claim 7, wherein said drive means comprises a main drive motor, a plurality of gears and chains across said gears, shafts for mounting said gears, said shafts carrying one of said rollers on each of said belts, and a plurality of vibrating motors, one of said vibrating motors being connected to each one of said vibrators in each loading assembly.

9. In a candy box filling machine the combination of a housing comprised of a first housing element supporting a platform and a pair of chutes in relatively vibration free manner, a pneumatic system within said housing element, a vibration system within said housing element, and a second housing element containing an endless belt for carrying a plurality of trays through said second housing and a loading unit mounted on said second housing unit.

10. In a candy box filling machine, the combination as set forth in claim 9 wherein said vibration system comprises a vibration system motor secured to the underside of each of said chutes and said platform, said chutes and platform being positioned to move candies thereupon in directions at right angle to an adjacent one of said chutes or platform, and said vibration motors each including a main switch and speed control unit in the electrical circuit thereof, and the platform vibration motor circuit further including a micro-switch activated by said pneumatic system.

11. In a candy box filling machine the combination as set forth in claim 10, wherein said pneumatic system includes a compressor, a first hose secured to the output end of said compressor, a second hose, a pneumatically powered micro-switch unit, said second hose secured to said micro-switch unit, the end of the first said hose secured to a side wall of one of said chutes and the second of said hoses secured to an opposite side of said chute to intercept candy pieces passing therebetween.

12. In a candy box filling machine the combination as set forth in claim 11, wherein said loading unit comprises a plurality of upstanding equally spaced apart plates secured together, a depression on the upper edges of said plates for receiving a candy therein and a diagonally downward inclined portion on said upper side for sliding said candy thereupon, an end plate serving as a candy backstop and a rotatable lever comprised of a plurality of arms between each said upstanding plate.

13. In a candy box filling machine the combination as set forth in claim 12, wherein said first housing element includes a brush unit stationarily supported on said element, said brush unit including a bracket supporting a brush, and said brush being in brushing engagement with vibrating candies supported on one of said chutes.

*14. In a candy box filling machine the combination as set forth in claim 1 wherein means is provided in conjunction with said first endless conveyor before said candy loading mechanism for shaping cups of said tray, said shaping means including reciprocating male dies adapted to reciprocate into said cups as said conveyor is moved in a stepwise manner.*

References Cited

The following references, cited by the Examiner, are of record in the patented file of this patent or the original patent.

UNITED STATES PATENTS

| | | | |
|---|---|---|---|
| 3,001,344 | 9/1961 | Morton | 53—124 R |
| 3,460,316 | 8/1969 | Mumma | 53—160 |
| 3,191,357 | 6/1965 | Hawley et al. | 53—240 |

FOREIGN PATENTS

| | | |
|---|---|---|
| 205,511 | 1/1959 | Austria. |

WAYNE A. MORSE, Jr., Primary Examiner

U.S. Cl. X.R.

53—155, 160, 183, 238, 246, 263